United States Patent
Frachtenberg et al.

(10) Patent No.: US 10,135,928 B2
(45) Date of Patent: *Nov. 20, 2018

(54) NETWORK INTERFACE DEVICE HAVING GENERAL-PURPOSE COMPUTING CAPABILITY

(71) Applicant: Facebook, Inc., Menlo Park, CA (US)

(72) Inventors: Eitan Frachtenberg, Palo Alto, CA (US); Mateusz Berezecki, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/093,641

(22) Filed: Apr. 7, 2016

(65) Prior Publication Data

US 2016/0234317 A1    Aug. 11, 2016

Related U.S. Application Data

(63) Continuation of application No. 13/565,615, filed on Aug. 2, 2012, now Pat. No. 9,350,828.

(51) Int. Cl.
*H04L 29/08* (2006.01)
*H04L 29/06* (2006.01)

(52) U.S. Cl.
CPC .......... *H04L 67/142* (2013.01); *H04L 69/12* (2013.01)

(58) Field of Classification Search
CPC .................. H04L 67/142; H04L 69/12
See application file for complete search history.

(56) References Cited

U.S. PATENT DOCUMENTS

| | | | | |
|---|---|---|---|---|
| 7,116,764 | B1* | 10/2006 | Russell | H04M 3/533 379/88.13 |
| 8,681,776 | B2* | 3/2014 | Lu | H04L 45/7453 370/352 |
| 9,350,828 | B2 | 5/2016 | Frachtenberg et al. | |
| 2002/0107962 | A1* | 8/2002 | Richter | H04L 29/06 709/225 |
| 2003/0110294 | A1* | 6/2003 | Luo | H04L 29/06 709/245 |
| 2010/0329257 | A1* | 12/2010 | Vanzante | H04L 49/90 370/392 |
| 2013/0159449 | A1* | 6/2013 | Taylor | G06F 15/167 709/212 |

(Continued)

OTHER PUBLICATIONS

Non-Final Office Action dated Apr. 24, 2015, for U.S. Appl. No. 13/565,615, of Frachtenberg, E. filed Aug. 2, 2012.

(Continued)

*Primary Examiner* — Uzma Alam
(74) *Attorney, Agent, or Firm* — Van Pelt, Yi & James LLP (57) ABSTRACT

Techniques for a network interface controller (NIC) capable of performing general-purpose computing tasks without intervention from a central processing unit (CPU) are disclosed herein. The network interface controller includes a circuit board, a network interface, a computer bus interface and a processor. The network interface is operatively coupled to the circuit board for receiving network packets. The computer bus interface is operatively coupled to the circuit board for receiving a general-purpose program. The processor is operatively coupled to the circuit board and capable of executing the general-purpose program to process the network packets.

20 Claims, 7 Drawing Sheets

(56) References Cited

U.S. PATENT DOCUMENTS

2014/0040506 A1    2/2014  Frachtenberg et al.

OTHER PUBLICATIONS

Non-Final Office Action dated Sep. 24, 2015, for U.S. Appl. No. 13/565,615, of Frachtenberg, E. filed Aug. 2, 2012.
Notice of Allowance dated Feb. 26, 2016, for U.S. Appl. No. 13/565,615, of Frachtenberg, E. filed Aug. 2, 2012.
U.S. Appl. No. 13/565,615 by Frachtenberg, E., et al., filed Aug. 2, 2012.

* cited by examiner

NETWORK INTERFACE DEVICE HAVING GENERAL-PURPOSE COMPUTING CAPABILITY

CROSS-REFERENCE TO RELATED APPLICATIONS

This application is a continuation of U.S. patent application Ser. No. 13/565,615, entitled "NETWORK INTERFACE DEVICE HAVING GENERAL-PURPOSE COMPUTING CAPABILITY," filed on Aug. 2, 2012, which is incorporated herein by reference in its entirety.

FIELD OF THE INVENTION

This invention relates generally to network interface devices, and in particular to a network interface controller (NIC) capable of performing general-purpose computing tasks without intervention from a central processing unit (CPU).

BACKGROUND

Central Processing Units (CPUs) have been gaining increasing performance capability exponentially over the past 40 years, in accordance with Moore's Law. CPUs are not only growing faster and faster, but also are applied to increasing number of applications, such as logic based computation, integer and floating-point arithmetic, string processing, multimedia processing, encryption, and error correction. CPUs also contain a large number of transistors dedicated to alleviate common performance bottlenecks, such as slow memory fetches and frequent code branches.

Consequently, modern CPUs are quite adequate for a diverse set of workloads. But this trend comes at a cost, since the total amount of silicon components in a CPU is limited by thermal and economic constraints. Instead of requiring CPUs to handle all workloads, some workloads are better served by less general, more specific processors.

One example is graphic processor unit (GPU). GPUs were popularized by the commoditization of discrete graphics cards for higher graphics performance in workloads such as computer games, media creation, and computer-aided design. GPUs are specialized processors designed to process relatively few tasks involved in computer graphics in a very efficient way. But the new application of GPUs has been recently discovered and expanded. There is an entire class of non-graphics computation that can exploit these specialized functions of GPUs. Particularly, now GPUs can handle highly-parallel numeric codes for many scientific programs. New software libraries such as CUDA and OpenCL emerged to facilitate the use of this specialized hardware for codes that were originally designed for CPUs. The success of this model is evident in the fact that some of the fastest computers in the world now use these so called general-purpose GPUs (GPGPUs) as numerical accelerators.

However, general-purpose GPUs still have limitation for general-purpose computing. The hardware of GPUs are generally designed and optimized for floating point calculation. Thus GPUs offer little advantage over CPUs for computing tasks focusing on integer point calculation. Also due to the architectural nature of GPUs, GPUs gain performance advantage by parallelizing the computation. Yet not all computing tasks can be parallelized efficiently, this severely limits the application of general-purpose GPUs. Further, GPUs are typically fabricated on graphical expansion card. It is not efficient to use GPUs for certain tasks including high speed network data processing, since a large amount of data needs to transfer among network interface controllers (NICs), CPUs and GPUs.

With the growth of the Internet in terms of transmission speeds, it is common nowadays that a datacenter server or a desktop computer needs to process network transmitted data at a transmission speed over 1 gigabit per second. Processing the incoming network segments such as TCP or UDP can further pose an overhead burden on CPUs. As a result, a significant amount of the processing power of a CPU is dedicated to processing the network transmission, instead of running intended applications.

Some modern network interface controllers can offload the burden on the CPU by doing limited processes on the network transmitted data using dedicated hardware fabricated on the network interface controller (NIC). For example, some NICs include predetermined features such as TCP/IP offloading, encryption, and error correction that can relieve the CPU of the burden of computing these common (albeit limited) tasks. Nevertheless, the functionalities of the network interface controllers are fixed by the predetermined dedicated hardware. There is no mechanism for these network interface controllers to perform any general purpose computing tasks other than the pre-supplied functionalities

SUMMARY

The technology introduced here uses a network interface controller (NIC) to perform general-purpose computing tasks without intervention from a central processing unit (CPU). The network interface controller is designed to be installed and operating in a host computer. The network interface controller includes a circuit board, a network interface, a computer bus interface and a processor. The network interface is operatively coupled to the circuit board for receiving network packets. The computer bus interface is operatively coupled to the circuit board for receiving a general-purpose program. The processor is operatively coupled to the circuit board and capable of executing the general-purpose program to process the network packets and directly access data on the memory of the host computer based on the network packets without intervention from a central processing unit of the host computer.

The general-purpose NICs, as described herein, expand the functionality of existing NICs and support many new applications that were previously run exclusively on CPUs. With the ability of receiving and executing general-purpose programs, the GPNIC's functionalities are no longer confined by the fabricated hardware. Therefore, the disclosed general-purpose NICs can offload the burden of host computer CPUs so that CPUs can focus on other computing tasks.

Other aspects of the technology introduced here will be apparent from the accompanying figures and from the detailed description, which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. All occurrences of such phrases in this specification do not necessarily refer to the same embodiment.

Processors included in network interface controllers (NICs) have recently grown more sophisticated, powerful, and flexible, especially with high-end server NICs such as 10Gbe, Myrinet, and Infiniband NICs. The present invention discloses a type of NICs can be used as general-purpose NICs (GPNICs) to accelerate many computing tasks traditionally carried out by CPUs. The disclosed general-purpose NICs can not only expand the functionality of existing NICs, e.g., so that the controller can use arbitrary network-based compression methods, as opposed to just one compression method predetermined by a dedicated hardware; but also support many new applications that heretofore were run exclusively on CPUs. For example, a GPNIC can serve as a memory caching systems based on key-value stores and no-SQL databases (such as Memcached), a sophisticated storage server (such as Facebook's Haystack), and/or even a web server for delivering both static and dynamic content.

Figure 1:
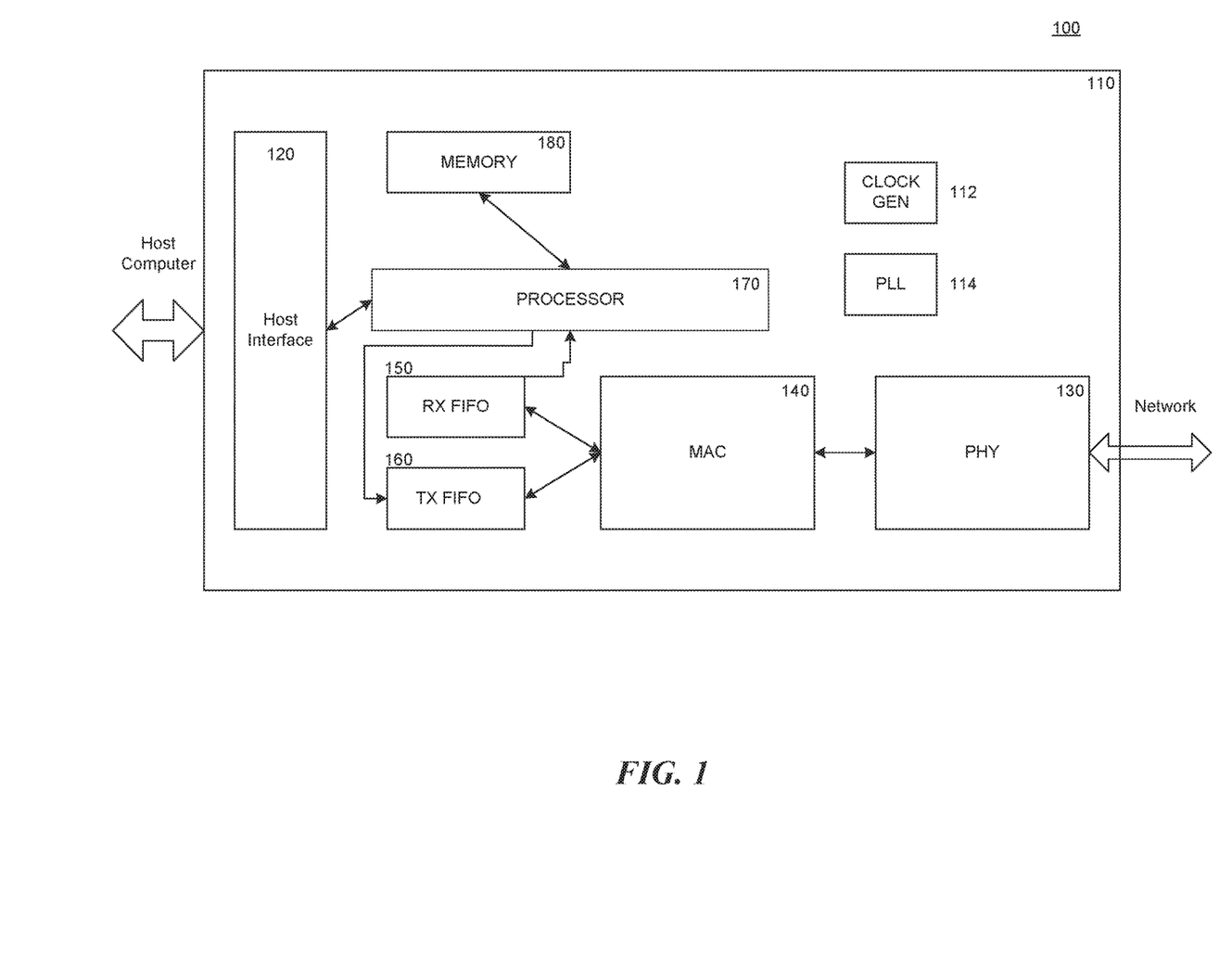
FIG. 1 illustrates a high level block diagram of a general-purpose network interface controller.

FIG. 1 illustrates a high level block diagram of a general-purpose network interface controller, in accordance with one embodiment of the present invention. The general-purpose network interface controller (GPNIC) 100 can be implemented as an expansion card based on a printed circuit board 110. The GPNIC 100 includes a computer bus interface 120 (also referred to as host interface) coupled to the circuit board 110. The computer bus interface 120 can be a conventional PCI interface, a PCI-X interface, a PCI Express interface, a USB interface, or any computer peripheral interconnects. In one embodiment, the computer bus interface 120 of the GPNIC 100 can be inserted into an expansion slot of a host computer, so that the GPNIC 100 can communicate with the host computer via the computer bus interface 120. As a network interface controller, the GPNIC 100 provides all functionalities as a conventional NIC, as appreciated by an ordinary skilled person in the art.

The GPNIC 100 further includes a physical network interface 130 coupled to the circuit board 110. The physical network interface (PHY) 130 can be configured for I/O of Ethernet, WiFi, Token Ring, or other forms of computer networks. For example, the physical network interface 130 can include a network cable socket so that an Ethernet cable can connect to the network interface 130. Or the physical network interface 130 can include an antenna for sending and receiving data to/from a WiFi network. In one embodiment, the physical network interface 130 can include a chip for Serializer/Deserializer (SerDes) functions. Since typically the network signals are serial signals and the bus signals in the computer systems are parallel signals, the physical network interface 130 uses the chip to convert the input and/or output signals between parallel and serial forms. The chip of the physical network interface 130 can further include a Physical Coding Sublayer to help defining physical layer specifications (e.g. speed and duplex modes) for networking protocols such as Fast Ethernet, Gigabit Ethernet and 10 Gigabit Ethernet. The physical network interface 130 can further include additional parts for data and clock recovery where applicable.

The GPNIC 100 further includes a Media Access Controller (MAC) 140 providing addressing and channel access control mechanisms that make it possible for several terminals or network nodes to communicate within a multiple access network that incorporates a shared medium, e.g. Ethernet. The MAC 140 can further include functionality as an 8b/10b decoder which maps 8-bit signals to 10-bit signals to achieve DC-balance and bounded disparity, and yet provides enough state changes to allow reasonable clock recovery. The MAC 140 can include additional functionality such as logical link control which provides multiplexing mechanisms that make it possible for several network protocols (e.g. IP, IPX, Decnet and Appletalk) to coexist within a multipoint network and to be transported over the same network media.

There may be buffers between the MAC 140 and a processor 170 of the GPNIC 100. For example, Receive first-in-first-out (RX FIFO) buffer 150 can be operatively coupled between the processor 170 and the MAC 140. Network packets received by network interface 130 can be buffered in RX FIFO 150 before being processed by the processor 170. In addition, Transmit first-in-first-out (TX FIFO) buffer 160 can be operatively coupled between the processor 170 and the MAC 140. New network packets generated by the processor 170 can be buffered in TX FIFO 160 before being sent to MAC 140 and network interface 130. In some embodiments, a host computer may be able to access the RX/TX FIFO buffers via the computer bus interface 120 using mechanism such as direct memory access (DMA).

The GPNIC 100 includes at least one general-purpose processor 170. A general-purpose processor is a processor that is not tied to a specific application or integrated with a specific piece of software. The general-purpose processor 170 can realize a functionally complete set of logic operators. Therefore, the general-purpose processor 170 is capable of executing a general-purpose program to process the network packets received by the network interface 130. A general-purpose program is a Boolean function that can be built-up from a subset of a functionally complete set of logic operators.

In some embodiments, the clock rate of the processor 170 is higher than the bitrate of the network packets being received from the network interface 130. For example, a GPNIC designed for receiving 1 gigabit/s of network traffic has a processor having a clock rate higher than 1 GHz.

Instead of a predetermined functionality as in conventional NICs, the GPNIC 100 can receive and execute various general-purpose programs received via the computer bus interface 120. The general-purpose programs can be supplied by a CPU of a host computer, or even a computer user via an input device of the host computer. The general program may be stored in an onboard read-write memory 180 of the GPNIC 100. When the processor 170 executes the general-purpose program, the read-write memory 180 can store the program state information to assist the computation in the processor 170.

During operation, the processor 170 is capable of executing the general-purpose program, which is not predetermined by hardware components of the GPNIC. By executing the general-purpose program stored in onboard memory 180, the processor 170 can process the network packets received from the network interface 130 and provide any functionality that can be realized by a program, instead of being confined to a predetermined functionality. For example, the program being executed in the processor 170 may recognize a client request based on the received network packets and generate a response to the client request. The response may be based on certain data that is stored in a volatile or non-volatile memory of the host computer. The processor can directly access the data stored in the memory of the host computer via the computer bus interface 120, without intervention from the CPU of the host computer. The processor then generates the response as a series of new network packets, based on the data retrieved from the host computer's memory. Then the network interface of the GPNIC is responsible for sending out the new network packets as a response to the client request.

The GPNIC 100 can further include a clock generator 112 and a phase lock loop (PLL) 114 connected to any components of GPNIC 100 that need phase lock reference signals. In some embodiments, a collection of clock generators and PLLs of various clock frequencies are included for supplying reference signals for components of the GPNIC 100 that require reference signals with different clock frequencies. In another embodiment, a component of the GPNIC 100 may contain its own built-in clock generator and/or PLL.

Figure 2:
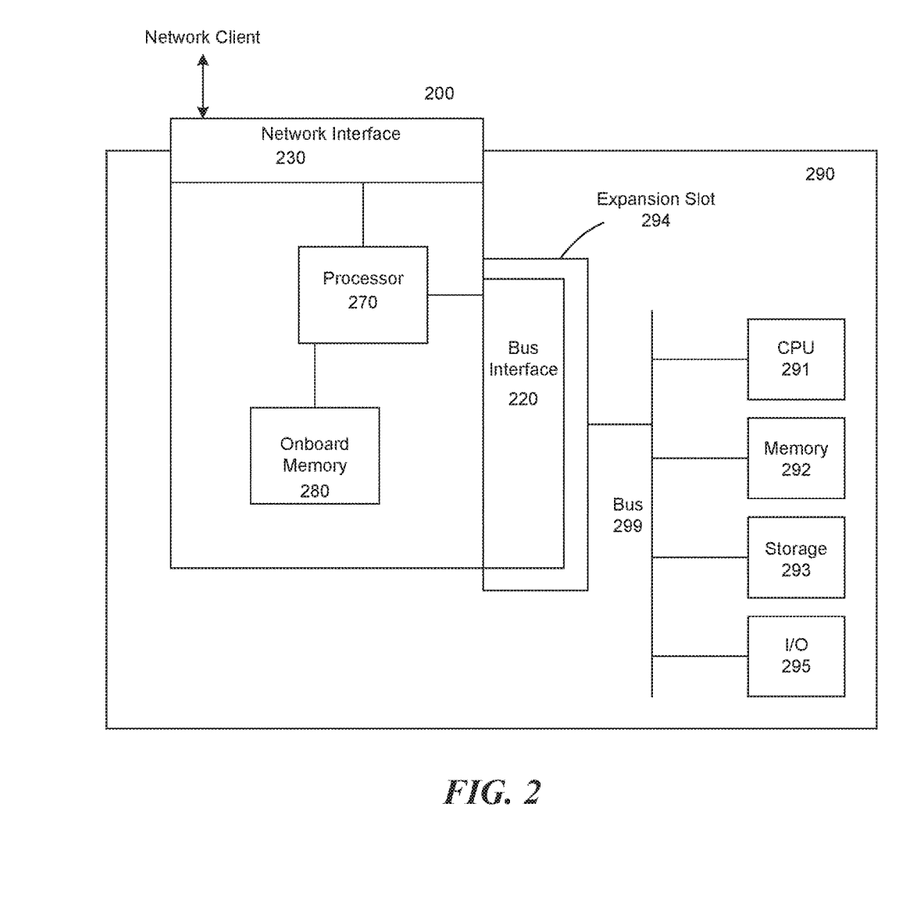
FIG. 2 illustrates a high level block diagram of a general-purpose network interface controller installed in a host computer.

FIG. 2 illustrates a high level block diagram of a general-purpose network interface controller 200 installed in a host computer. In one embodiment, the host computer 290 is a datacenter server. Similar to the GPNIC 100 disclosed in FIG. 1, the general-purpose network interface controller 200 includes a computer bus interface 220, a network interface 230, a general-purpose processor 270 and an onboard read-write memory 280. The computer bus interface 220 is inserted into an expansion slot 294 of the host computer 290. The expansion slot 294 can be a conventional PCI slot, a PCI-X slot, a PCI Express slot, a USB slot, or any computer peripheral slot for connecting peripheral devices. The GPNIC 200 communicates with other components of the host computer 290 via the computer bus interface 220. As a network interface controller, the GPNIC 200 provides functionalities as a conventional NIC, as appreciated by an ordinary skilled person in the art.

Besides the expansion slot 294, the host computer further includes a CPU 291, a volatile memory 292, a non-volatile storage 293, and at least one I/O device 295. The components of the host computer are interconnected by a bus 299.

The general-purpose processor 270 of GPNIC 200 is capable of executing a general-purpose program to process the network packets received by the network interface 230. Instead of a predetermined functionality as in conventional NICs, the GPNIC 200 can receive and execute various general-purpose programs received via the computer bus interface 120. The general-purpose programs can be supplied by CPU 291 of the host computer 290, or even a computer user via the I/O device 295. When the processor 270 executes the general-purpose program, the read-write memory 280 can store the program state information for running the program.

By executing the general-purpose program, the processor 270 can process the network packets received from the network interface 230 and provide any functionality that can be realized by a program, instead of being confined to a predetermined functionality. For example, by executing the program, the processor 270 may recognize a client request based on the received network packets. Certain data stored in the host memory 292 or host storage 293 is required to satisfy the client request. Thus the processor 270 directly accesses the data stored in the memory 292 or the storage 293 of the host computer 290 via the computer bus interface 220 without intervention from the CPU 291 of the host computer 290. The processor 270 then generates a response as a series of new network packets based on the data retrieved from the host computer 290. Then the processor 270 sends out the new network packets as a response of the client request via the network interface 230.

In one embodiment, the GPNIC 200 is connected to the host bus 299 via the bus interface 220. The GPNIC 200 responds to the enumeration requests as deemed appropriate by the protocol used for the interface 220, such as PCI Express enumeration requests. The GPNIC 200 implements a PCI backward compatible configuration space, as well as PCI Express configuration space as defined by the PCI Express standard. The GPNIC 200 identifies itself with the NETWORK_CLASS_CODE and may optionally identify itself as a multi-function device by setting appropriate capabilities bits in the type 0 PCI configuration space header. In case of a multi-function device, the device class code for the second function is a "general purpose device."

In the embodiment illustrated in the last paragraph, both the general-purpose computing and NIC functions are exposed via a memory-mapped set of registers used for communicating with the GPNIC 200. The base address at which these registers are available is assigned at boot time of the host computer 290, when the BIOS of the host computer 290 enumerates devices on various buses available in the system. For instance, in one embodiment, these memory spaces can be easily located by reading from a first PCI or PCI Express Base Address Register (BAR0).

In some embodiments, a GPNIC device 200 can come with a set of general-purpose mailbox registers in the memory-mapped space that the GPNIC 200 exposes to the host computer 290. This set of general-purpose registers can be used to perform arbitrary communications between the GPNIC 200 and the host computer 290, as well as to send code updates or program and to configure the GPNIC device 200.

In one embodiment, the host computer and the operating system of the host computer can access the GPNIC using memory-mapped input/output (MMIO) operations. The host computer and the host operating system use a common address bus to address both the memory of the host computer and the GPNIC. A range of the memory addresses are assigned to the GPNIC; the memory and registers of the GPNIC are mapped to memory address values within that range. So when a memory address is accessed by the host operating system, the memory address may refer to a portion of the memory of the host computer, or may refer to the memory or register of the GPNIC. Thus through the common address bus, the host operating system can issue instructions to access the GPNIC. A memory management unit (MMU) within the CPU of the host computer intercepts the instruction to access the memory range assigned to the GPNIC device. The MMU translates the instruction and generates a bus request. For example, in case that the GPNIC uses PCI Express interface, the bus request can be a PCI Express request to write data. The data travels to the GPNIC via the bus.

In one embodiment, the GPNIC utilizes a PCI, PCI-X, or PCI Express interface. When the host computer starts and conducts bus enumeration, the BIOS of the host computer detects and configures all peripheral device extension slots including the slot populated with the GPNIC. The BIOS then requests the peripheral devices to notify the BIOS of how large is the MMIO memory range that the peripheral devices require. After the GPNIC announces the requested size of the MMIO memory range, the BIOS configures the GPNIC and puts the address range assigned for the GPNIC into its base address registers inside of the PCI configuration space. Following the boot process of the host operating system, the host operating system can read those registers and will know from now on, where is the MMIO memory range for the GPNIC. In some other embodiments, the GPNIC can use a bus interface other than the PCI family.

Once the host operating system knows the MMIO range of the GPNIC device, it can communicate with the GPNIC by issuing read and write operations to the GPNIC. The host operating system controls the access of the MMIO range and enforces the access permission of the MMIO range to avoid security issues when user processes interacts/counteracts with requests from other processes.

In order to secure the MMIO range, the host operating system sets the appropriate bits in the address translation tables consistent with the desired permissions that the host operating system wants to grant to user processes. In some embodiments, the host operating system is the only entity able to directly read and write from this memory region and then it tracks usage of the region by allowing users to interact with the MMIO region via a special system such as an application programming interface (API). In such a case, the API usually contains all the necessary logic to track and allow/disallow accesses by processes.

In one embodiment, to control concurrent accesses to the GPNIC, a request FIFO in the GPNIC can keep a backlog of programs to run; and the GPNIC run one program fetched from the backlog at a time.

In another embodiment, the GPNIC can have a finite set of triggers and filters of that each would trigger a different program among the programs that access the GPNIC concurrently to run. For example, the GPNIC can have a set of packet filters to match the trigger information embedded in the incoming network packets. If the GPNIC detects that the TCP or UDP address and destination port of the incoming packets match one of the filters, the GPNIC runs a program associated to that filter to process these incoming packets. When the GPNIC detects that the TCP or UDP address and destination port of new packets match a second filter, the GPNIC runs another program associated to the second filter to process the new packets.

The GPNIC can establish a priority order of matching filters. For example, a priority order can prefer matching source IP address first and then matching source TCP or UDP destination port second. The GPNIC can also define other priority orderings based on protocol type, Ethernet type for Ethernet packets, source IP, destination IP, source port, or destination port. The filtering mechanism allows multiple programs to be uploaded to the GPNIC and each of the programs can be triggered on different packets (events).

The host operating system, including the API logic in the driver, can ensure only one program is associated for each filter slot available. For example, the GPNIC can have a single program that decompresses the packet and then transforms the packet in some way, instead of having one program decompressing and passing the packet to a second program that transforms the packet. The GPNIC can have multiple programs uploaded and the GPNIC can return a completion confirmation or an error code to the driver of the host operating system, which in turn notifies via the API the user program if the request of running a program has been completed.

Applications using the GPNIC can realize various functionalities for processing the incoming network packets, including Memcached, Facebook's Haystack, and even a simple web server for both static and dynamic content. The following paragraphs discuss some of the scenarios involving the GPNIC as disclosed in FIGS. 1 and 2.

Figure 3:
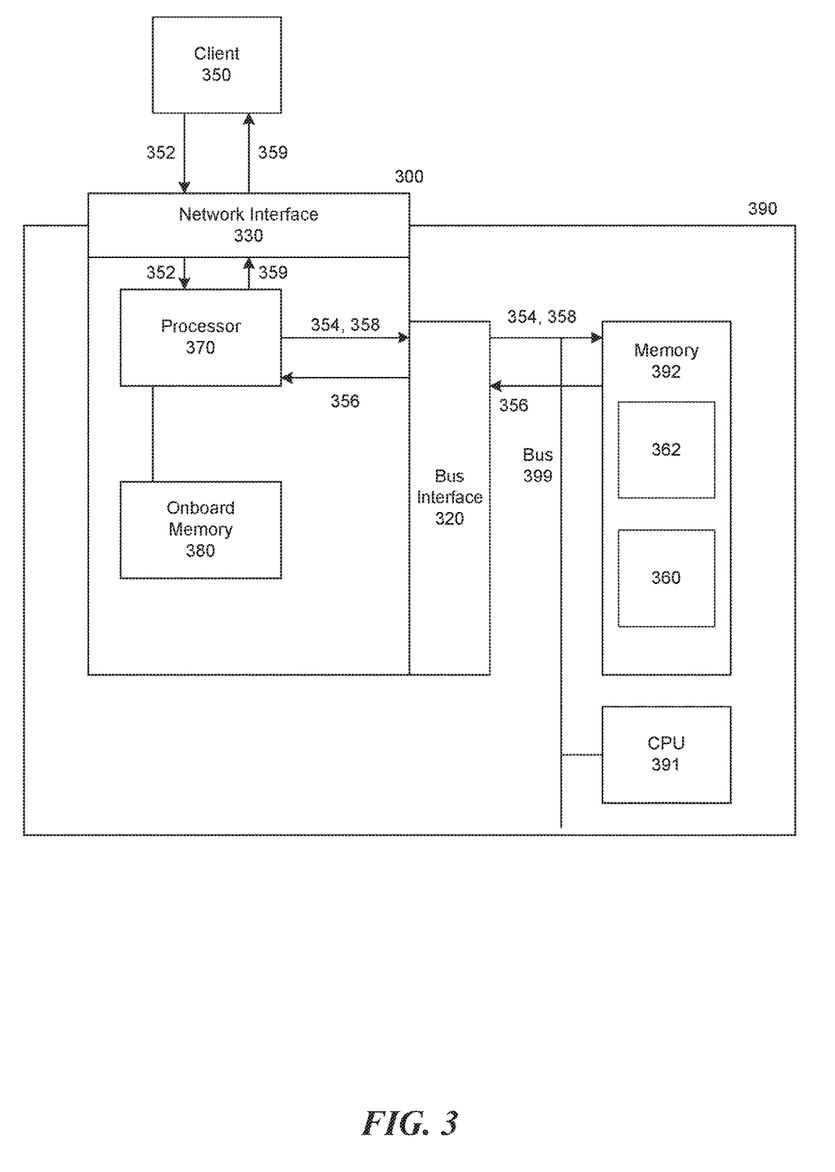
FIG. 3 illustrates a high level block diagram of a general-purpose network interface controller running a Memcached application.

FIG. 3 illustrates a high-level block diagram of a general-purpose network interface controller 200 running a Memcached application. Memcached is a general-purpose distributed memory caching system that uses a client-server architecture. The servers maintain a key-value associative array. The clients populate and query this array. Keys are up to 250 bytes long and values can be at most 1 megabyte in size.

As shown in FIG. 3, a client 350 uses a client side library to locate a datacenter server 390 for a Memcached service. The client 350 sends a Memcached service request 352 to the datacenter server 390 at a port (e.g. port 11211). The Memcached service request 352 includes a key 354 which is associated with a value 356 in a key-value associative array 360 stored in a volatile memory 392 of the datacenter server 390, wherein the client 350 attempts to set or read the value 356 corresponding to the key 354.

A network interface 330 of a general-purpose network interface controller 300 receives the Memcached service request 352 including a key 354 at a port such as port 11211. A general purpose processor 370 of the GPNIC 300, instead of a CPU 391 of the datacenter server 390, is responsible for responding the Memcached service request 352 and executes a Memcached server program while the GPNIC 300 continues to serve as a regular NIC. The Memcached server program executed by the processor 370 determines the type of requests that the processor 370 is responsible for. The processor 370 scans the incoming network packets. When the processor 370 detects the Memcached service request 352 from the incoming network packets, the processor 370 does not forward the request 352 to the CPU 391 of the datacenter server 390. Instead, the processor 370 handles and responds to the request 352 without intervention from the CPU 391. The processor 370 can forward other types of network packets and requests to the CPU 391.

In another embodiment, the Memcached server program executed by the processor 370 forwards all network packets and requests to the CPU 391. The CPU 391 can decide which Memcached service request is to be processed by the GPNIC processor 371. Once the processor 371 receives a Memcached service request sent by the CPU 391, the Memcached server program executed by the processor 370 starts to handle and respond to the request without intervention from the CPU 391.

Following the instruction of the Memcached server program, the processor 370 extracts the key 354 from the Memcached service request 352, and then computes a hash 358 of the key 354. The processor 370 directly accesses the memory 392 of the datacenter server 390 via a bus interface 320 and bus 399, and compares the hash 358 with entries of a hash table 362, without intervention from the CPU 391. If the processor 370 finds that an entry of the hash table 362 matches the hash 358, the processor 370 further checks that the key 354 matches the key in that entry of the hash table 362.

Using the matched entry of the hash table 362, the processor 370 is able to locate the value 356 in the key-value associative array 360 stored in the volatile memory 392 of the datacenter server 390. If the Memcached service request 352 is a read request, the processor 370 directly accesses the memory 392 of the datacenter server 390 via a bus interface 320 and bus 399, to read the value 356 associated with the key 354, without intervention from the CPU 391. Then the processor 370 generates a series of new network packets 359 including the information of the value 356, as a response to the Memcached service request 352. Then the network interface 330 sends the new network packets 359 to the client 350 to deliver the content of the requested value.

If the Memcached service request 352 is a set request, the processor 370 directly accesses the memory 392 to set the value 356 associated with the key 354, using a value included in the Memcached service request 352, without intervention from the CPU 391. Then the processor 370 generates a series of new network packets 359 as a response to the Memcached service request 352 that confirms the set request. Then the network interface 330 sends the network packets 359 to the client 350 as a response.

In one embodiment, the hash table 362 can be stored in an onboard memory 380 of the GPNIC 300, instead of the memory 392 of the datacenter server 390. Accordingly, the processor 370 just needs to access the GPNIC 300's own onboard memory 380 to compare the hash 358 with the entries of the hash table 362. In another embodiment, even a portion of or the entire the key-value associative array 360 can be stored in the onboard memory 380 of the GPNIC 300, instead of memory 392 of the datacenter server 390. In such a case, the processor 370 may even process the Memcached request 3520 without the need of accessing any other components of the datacenter server 390 outside of the GPNIC 300 via the bus interface 320.

As illustrated in FIG. 3, the GPNIC 300 (including the processor 370) handles the Memcached request by directly accessing the host computer memory (the memory 392 of the datacenter server 390), without intervention from the host computer CPU 291. The task of handling the Memcached request is a general-purpose computing task run by the GPNIC 300, while the GPNIC 300 continues to serve as a regular NIC for the datacenter server 390. Further, the datacenter server 390, or a user of the datacenter server 390, can instruct the GPNIC 300 to run other general purpose applications, by providing other general-purpose programs to the GPNIC 300. For example, the GPNIC can also handle HTTP based photo request from a generic object store called Haystack.

Haystack is a type of generic object store utilized to eliminate unnecessary metadata overhead for photo read operations. In one embodiment, Haystack is deployed on top of commodity storage blades. Each storage blade provides terabytes of storage space. The storage blades can be configured as RAID partitions (e.g. RAID-6) managed by hardware RAID controllers, to provide redundancy and to increase read performance.

Figure 4:
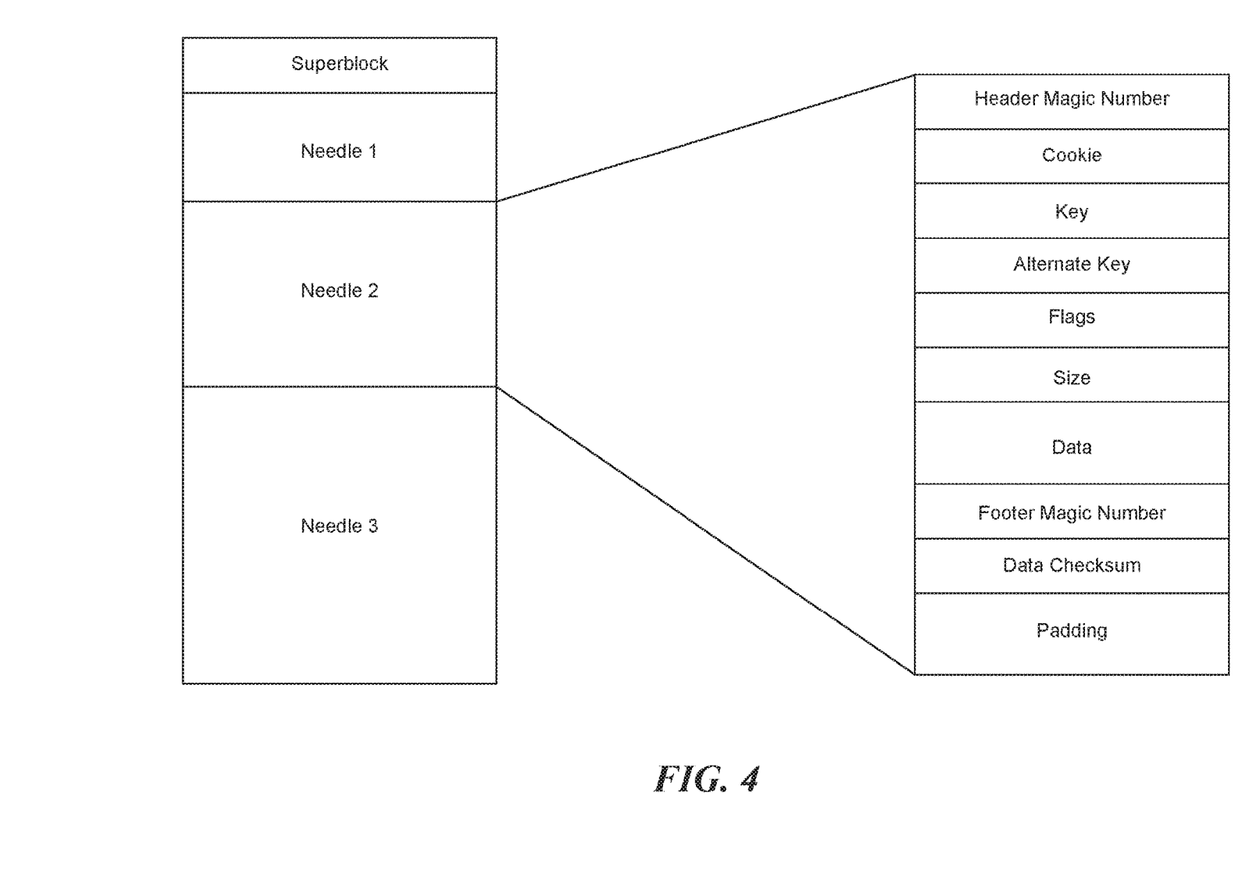
FIG. 4 shows a layout of a haystack store file.

Built upon these storage blades, Haystack is a log structured (append-only) object store containing needles that represent the stored objects (e.g. photos). A Haystack consists of two files: the actual haystack store file containing needles, plus an index file. FIG. 4 shows the layout of a haystack store file. The first 8 KB of the haystack store is occupied by the superblock. Immediately following the superblock are needles, with each needle consisting of a header, the data, and a footer. A needle is uniquely identified by its offset key, where the offset is the needle offset in the haystack store. There is a corresponding index record for each needle in the haystack store file, and the order of the needle index records must match the order of the associated needles in the haystack store file. The index file provides the minimal metadata required to locate a particular needle in the haystack store file. Loading and organizing index records into a data structure for efficient lookup is the responsibility of the Haystack application (e.g. photo store). The index file is not critical, as it can be rebuilt from the haystack store file if required. The main purpose of the index is to allow quick loading of the needle metadata into memory without traversing the larger Haystack store file, since the index is usually less than 1% the size of the store file.

A Haystack write operation synchronously appends new needles to the haystack store file. After the needles are committed to the larger Haystack store file, the corresponding index records are then written to the index file. Since the index file is not critical, the index records are written asynchronously for faster performance. The index file is also periodically flushed to the underlying storage to limit the extent of the recovery operations caused by hardware failures. Haystack does not allow overwrite of an existing needle offset, so if a needle's data needs to be modified, a new version of it is written using the same key value. Applications can then assume that among the needles with duplicate keys, the one with the largest offset is the most recent one.

The parameters passed to the haystack read operation can include the needle offset, key, cookie and the data size. Haystack then adds the header and footer lengths to the data size and reads the whole needle from the file. The read operation succeeds only if the key and cookie match the ones passed as arguments, if the data passes checksum validation, and if the needle has not been previously deleted.

Figure 5:
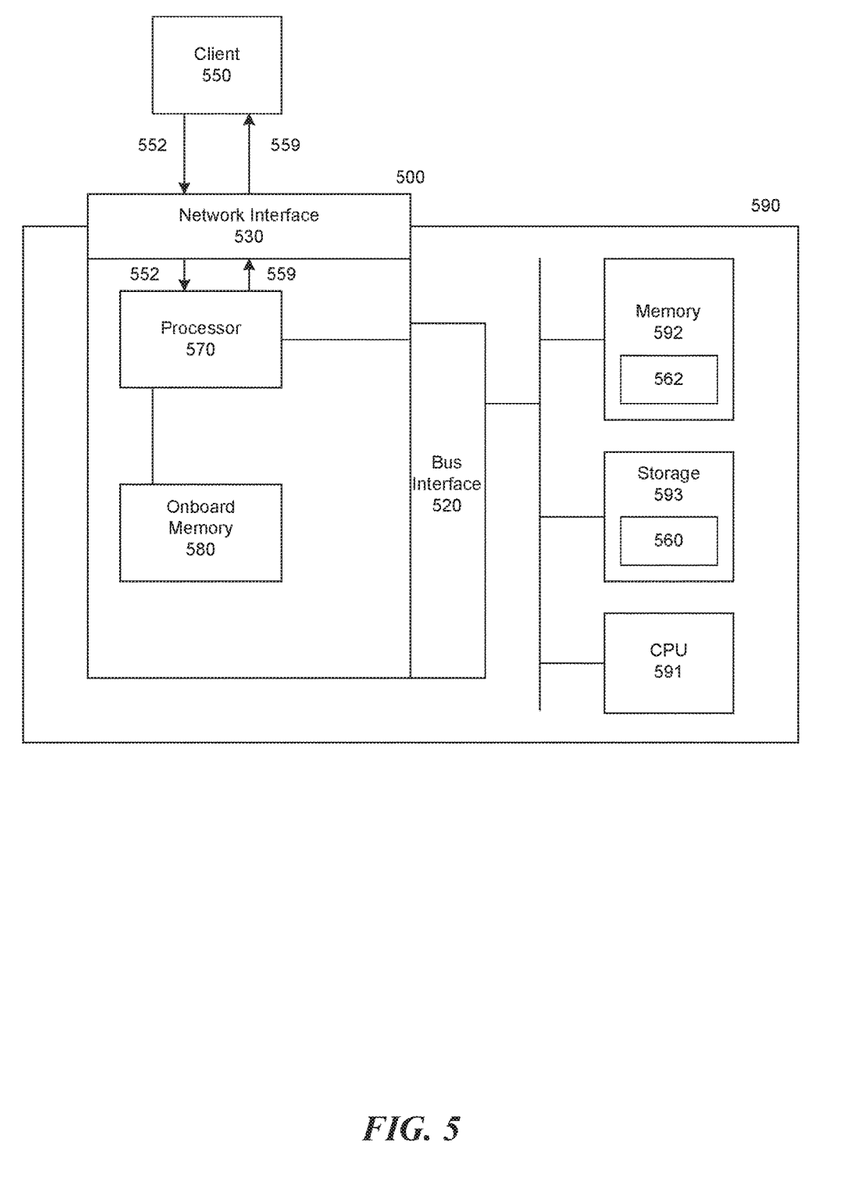
FIG. 5 illustrates a high level block diagram of a general-purpose network interface controller running as a haystack photo store server.

FIG. 5 illustrates a high level block diagram of a general-purpose network interface controller 500 running as a Haystack photo store server. The GPNIC 500 receives HTTP requests for photo files and translates the requests to the corresponding Haystack store operations, without the intervention from a host CPU 592 of a server 590. In order to minimize the number of I/Os required to retrieve photos, an in-memory index 562 of the photo offsets in the haystack store file 560 is kept in the memory 592 of the server 590.

As shown in FIG. 5, a client 550 sends an HTTP photo read request 552 to the server 590. The HTTP photo read request 552 includes a haystack ID, a photo key and a cookie. A network interface 530 of the general-purpose network interface controller 500 receives the HTTP photo read request 352. A general-purpose processor 570 of the GPNIC 500, instead of a CPU 591 of the server 590, is responsible for responding the HTTP photo read request 552 and executes a Haystack server program while the GPNIC 500 continues to serve as a regular NIC for the server 590. The Haystack server program executed by the processor 570 determines the type of requests that the processor 570 is responsible for. The processor 570 scans the incoming network packets. When the processor 570 detects the HTTP photo read request 552 from the incoming network packets, the processor 570 does not forward the request 552 to the CPU 591 of the server 590. Instead, the processor 570 handles and responds to the request 552 without intervention from the CPU 591. The processor 570 can forward other types of network packets and requests to the CPU 591.

In another embodiment, the Haystack server program executed by the processor 570 forwards all network packets and requests to the CPU 591. The CPU 591 can decide which HTTP photo request is to be processed by the GPNIC processor 571. Once the processor 571 receives a HTTP photo request sent by the CPU 591, the Haystack server program executed by the processor 570 starts to handle and respond to the request without intervention from the CPU 591.

Following the instruction of the Haystack server program, the processor 570 directly access the memory 592 via a bus interface 520 and a bus 599 to perform a lookup in the in-memory index 562 based on the photo key. If the processor 570 finds the photo key in the in-memory index 562, the processor retrieves the offset of the needle containing the requested image. Using the offset of the needle, the processor directly access the storage 593 via a bus interface 520 and a bus 599 to perform the haystack read operation to get the image directly from the needle stored in the storage 593. Then the processor 570 generates a series of network packets 559 including the content of the photo, as a response to the HTTP photo read request 552. The network interface 530 sends the network packets 559 to the client 550 to deliver the photo.

During the task of handing the Haystack HTTP read request, the processor 570 communicates directly to the memory 592 and the storage 593 of the server 590, without the involvement of the CPU 591.

In another embodiment, the in-memory index 562 can be stored in an onboard memory 580 of the GPNIC 500, instead of memory 592 of the server 590. Accordingly, the processor 570 just needs to access the GPNIC 500's own onboard memory 580 to perform the lookup in the in-memory index 562 based on the photo key.

The task of handling Haystack HTTP read request is a general-purpose computing task run by the GPNIC 500, while the GPNIC 500 continues to serve as a regular NIC for the server 590. The server 590, or a user of the datacenter server 590, can instruct the GPNIC 500 to run other general purpose applications, by providing other general-purpose programs to the GPNIC 500. For example, the GPNIC serves a regular HTTP server to handle all HTTP requests for static and dynamic content, by accessing memory and storage of the server directly, without involvement of the server CPU.

In another embodiment, a GPNIC installed in a node of a Hadoop cluster can handle data compression and decompression. When the Hadoop node receives the data, the processor on the GPNIC, instead of the node CPU, can compress the data before storing the data in this node or other nodes in the Hadoop cluster. Similarly, the processor on the GPNIC, instead of the node CPU, can decompress data before sending out the data to clients. In another embodiment, the processor on the GPNIC can handle encryption and decryption of network data.

Figure 6:
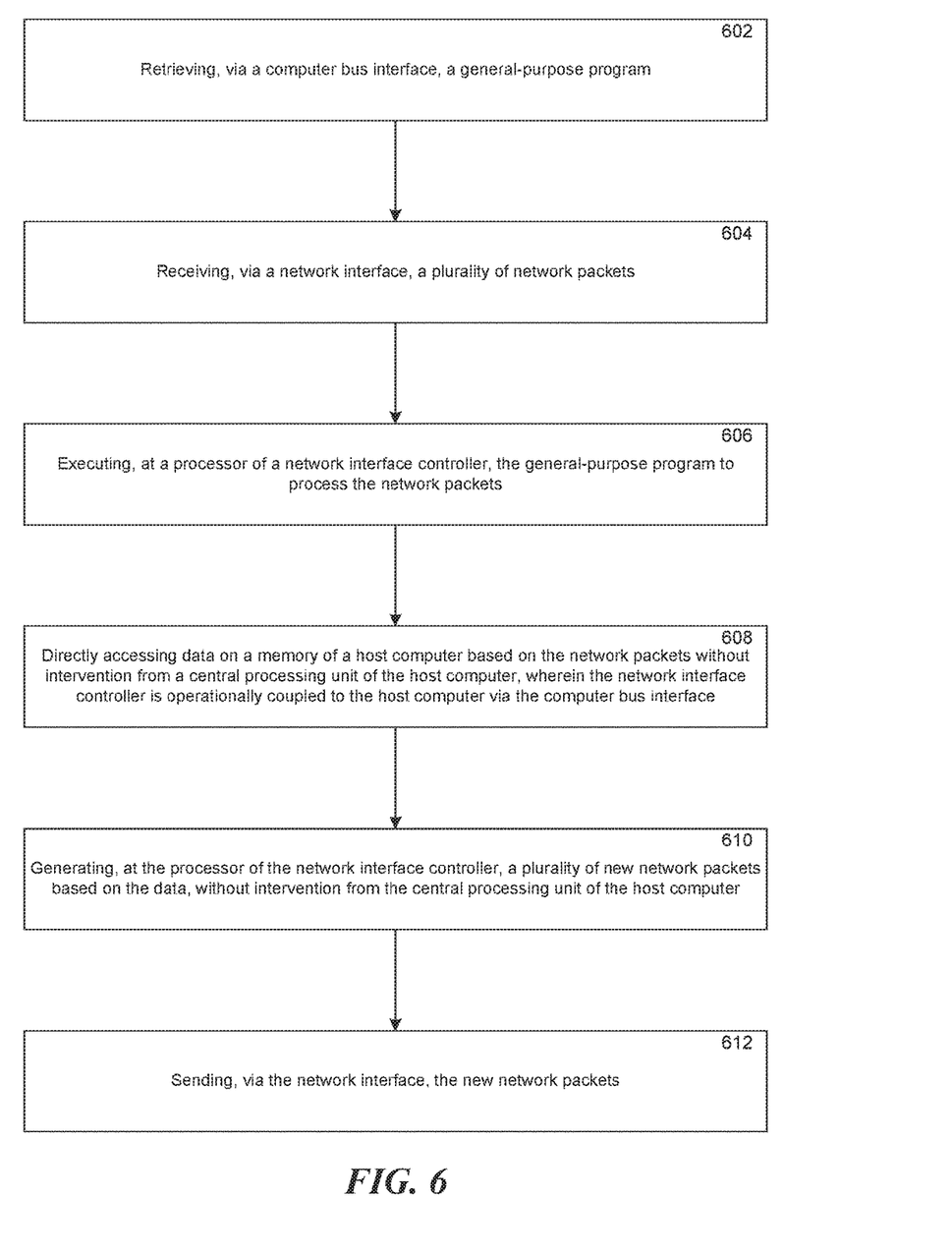
FIG. 6 illustrates a high level block diagram of a process for a general-purpose network interface controller performing general-purpose computing tasks without intervention from a central processing unit.

FIG. 6 illustrates a high level block diagram of a process for a general-purpose network interface controller (GPNIC) performing general-purpose computing tasks without intervention from a central processing unit. At step 602, a GPNIC receives a general-purpose program via a computer bus interface of the GPNIC. Then at step 604, the GPNIC receives a plurality of network packets via a network interface of the GPNIC. In order to respond to the network packets, the GPNIC executes the general-purpose program to process the network packets (606), at a processor of the GPNIC.

Following the instruction of the general-purpose program, at 608, the processor directly accesses data on a memory of a host computer based on the network packets without intervention from a central processing unit of the host computer, wherein the network interface controller is operatively coupled to the host computer via the computer bus interface. Then at 610, the processor generates a plurality of new network packets based on the data, without intervention from the central processing unit of the host computer. Via the network interface, the GPNIC sends out the new network packets as a response to the received network packets (612).

Figure 7:
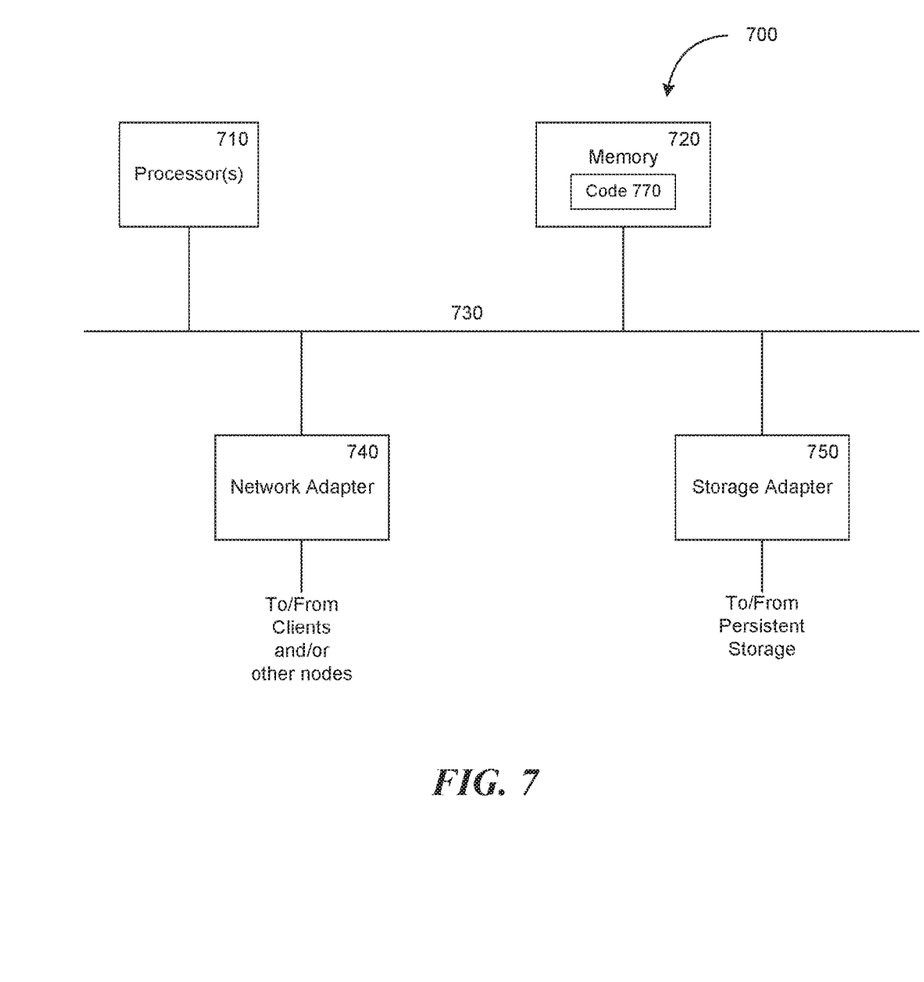
FIG. 7 is a high-level block diagram showing an example of the architecture of a node, which may represent any datacenter server or host computer described herein.

FIG. 7 is a high-level block diagram showing an example of the architecture of a node, which may represent any datacenter server or host computer described herein. The node 700 includes one or more processors 710 and memory 720 coupled to an interconnect 730. The interconnect 730 shown in FIG. 7 is an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 710 is/are the central processing unit (CPU) of the storage controller 700 and, thus, control the overall operation of the node 700. In certain embodiments, the processor(s) 710 accomplish this by executing software or firmware stored in memory 720. The processor(s) 710 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 720 is or includes the main memory of the node 700. The memory 720 represents any form of random access memory (RAM), read-only memory (ROM), flash memory, or the like, or a combination of such devices. In use, the memory 720 may contain a code 770. In one embodiment, the code 770 includes a general programming module configured to recognize the general-purpose program received via the computer bus interface, and prepare the general-purpose program for execution at the processor. In another embodiment, the general programming module may be implemented using hardware circuitry such as application-specific integrated circuits (ASICs), programmable logic devices (PLDs), or field-programmable gate arrays (FPGAs).

Also connected to the processor(s) 710 through the interconnect 730 are a network adapter 740 and a storage adapter 750. The network adapter 740 provides the node 700 with the ability to communicate with remote devices, over a network and may be, for example, an Ethernet adapter or Fibre Channel adapter. The network adapter 740 may also provide the node 700 with the ability to communicate with other nodes within the cluster. In some embodiments, a node may use more than one network adapter to deal with the communications within and outside of the cluster separately. The storage adapter 750 allows the node 700 to access a persistent storage, and may be, for example, a Fibre Channel adapter or SCSI adapter.

The code 770 stored in memory 720 may be implemented as software and/or firmware to program the processor(s) 710 to carry out actions described above. In certain embodiments, such software or firmware may be initially provided to the node 700 by downloading it from a remote system through the node 700 (e.g., via network adapter 740).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A hardware network interface controller, comprising:
   a circuit board;
   a network interface operatively coupled to the circuit board for receiving network packets, the network packets including a client request;
   a computer bus interface operatively coupled to the circuit board for receiving a general-purpose program from a memory of a host computer; and
   a hardware processor operatively coupled to the circuit board and configured to execute the general-purpose program to process the network packets and to directly access data on the memory of the host computer via the computer bus interface based on the network packets without intervention from a central processing unit of the host computer, wherein the hardware processor and the circuit board are included in the hardware network interface controller that is removable from the host computer, and the hardware processor executing the general-purpose program on the hardware network interface controller accesses the memory of the host computer that is external to the hardware network interface controller;
   wherein the hardware network interface controller is an expansion card configured to be inserted in the host computer as a single insertable component within the host computer for both providing network connectivity capability to the host computer and executing the general-purpose program without intervention from the central processing unit of the host computer.

2. The hardware network interface controller of claim 1, wherein the hardware processor is further configured to generate a plurality of new network packets based on the data from the memory of the host computer as a result of the executing the general-purpose program to process the network packets, the network packets including a response to the client request that is generated by the hardware processor without intervention from the central processing unit of the host computer.

3. The hardware network interface controller of claim 2, wherein the hardware network interface controller is configured to send via the network interface the new network packets including the response to the client request.

4. The hardware network interface controller of claim 1, wherein at boot time the host computer assigns a memory-mapped set of registers for communication between the hardware network interface controller and the host computer.

5. The hardware network interface controller of claim 1, wherein the general-purpose program is based on a functionally complete set of logic operators.

6. The hardware network interface controller of claim 1, wherein the network interface is an Ethernet interface, a WiFi interface, or a Token Ring interface.

7. The hardware network interface controller of claim 1, wherein the computer bus interface is a PCI interface, a PCI-X interface, a PCI Express interface, or a USB interface.

8. The hardware network interface controller of claim 1, wherein a clock rate of the hardware processor is higher than a bitrate of the network packets.

9. The hardware network interface controller of claim 1, wherein the network packets comprises at least one of TCP segments and UDP segments.

10. The hardware network interface controller of claim 1, further comprising:
    a read-write memory operatively coupled to the circuit board for storing the general-purpose program and storing program state information when the hardware processor executes the general-purpose program.

11. The hardware network interface controller of claim 1, wherein the processor is configured to execute the general-purpose program to process the network packets while the processor continues to serve regular network interface controller tasks.

12. A computer, comprising:
    a central processing unit;
    a memory; and
    a hardware network interface controller expansion card inserted in the computer, the network interface controller expansion card including:
    a circuit board;
    a network interface operatively coupled to the circuit board for receiving network packets, the network packets including a client request;
    a computer bus interface operatively coupled to the circuit board for receiving a general-purpose program and directly accessing the memory of the computer; and
    a hardware processor of the network interface controller expansion card operatively coupled to the circuit board and configured to execute the general-purpose program to process the network packets and to directly access data on the memory of the computer via the computer bus interface based on the network packets without intervention from the central processing unit of the computer, wherein the hardware processor and the circuit board are included on the same hardware network interface controller expansion card that is insertable in the computer, the hardware network interface controller expansion card provides network connectivity capability to the computer and executes the general-purpose program without intervention from the central processing unit of the computer, and the hardware processor executing the general-purpose program on the hardware network interface controller expansion card accesses the memory of the computer that is external to the hardware network interface controller.

13. The computer of claim 12, wherein the hardware processor is further configured to generate a plurality of new network packets based on the data from the memory of the host computer as a result of the executing the general-purpose program to process the network packets, the network packets including a response to the client request that is generated by the hardware processor without intervention from the central processing unit of the computer; and the network interface is further configured to send the new network packets including the response to the client request.

14. The computer of claim 12, wherein the network interface controller expansion card further includes:
a general programming module configured to recognize the general-purpose program received via the computer bus interface, and prepare the general-purpose program for execution at the hardware processor.

15. The computer of claim 12, wherein, during operation, the hardware processor of the network interface controller expansion card is configured to execute a general-purpose program that is not predetermined by hardware components of the network interface controller expansion card.

16. The computer of claim 12, wherein the memory of the computer includes a volatile memory or a non-volatile storage.

17. The computer of claim 12, wherein the general-purpose program is a computing task for Memcached, Haystack, web server, compression, decompression, encryption, or decryption.

18. A computer implemented method, comprising:
retrieving, via a computer bus interface of a network interface controller, a general-purpose program from a memory of a host computer, wherein the network interface controller is an expansion card inserted in the host computer;
receiving, via a network interface of the hardware network interface controller, a plurality of network packets, the received network packets including a client request;
in response to the client request, executing, at a hardware processor of the network interface controller, the general-purpose program to process the network packets, and to directly access data on the memory of the host computer via the computer bus interface based on the network packets without intervention from a central processing unit of the host computer wherein the network interface controller expansion card includes the hardware processor and a circuit board, the network interface controller expansion card is insertable in the host computer, the network interface controller expansion card provides network connectivity capability to the host computer and executes the general-purpose program without intervention from the central processing unit of the host computer, and the hardware processor executing the general-purpose program on the network interface controller expansion card accesses the memory of the host computer that is external to the network interface controller expansion card.

19. The computer implemented method of claim 18, further comprising:
executing the general-purpose program to generate a plurality of new network packets based on the data as a result of executing the general purpose program, wherein the new network packets include a response to the client request that is generated without intervention from the central processing unit of the host computer.

20. The computer implemented method of claim 19, further comprising:
sending, via the network interface of the hardware network interface controller, the new network packets including the response to the client request.

* * * * *